Nov. 28, 1961 H. P. BOSWAU 3,011,028

SIGNALING SYSTEM

Filed May 7, 1958

INVENTOR.
HANS P. BOSWAU

BY E. R. Sejer

ATTY.

United States Patent Office 3,011,028
Patented Nov. 28, 1961

3,011,028

SIGNALING SYSTEM

Hans P. Boswau, Los Altos, Calif., assignor to Leich Electric Company, Genoa, Ill., a corporation of Illinois Filed May 7, 1958, Ser. No. 733,719
16 Claims. (Cl. 179—16)

Figures 1, 2:
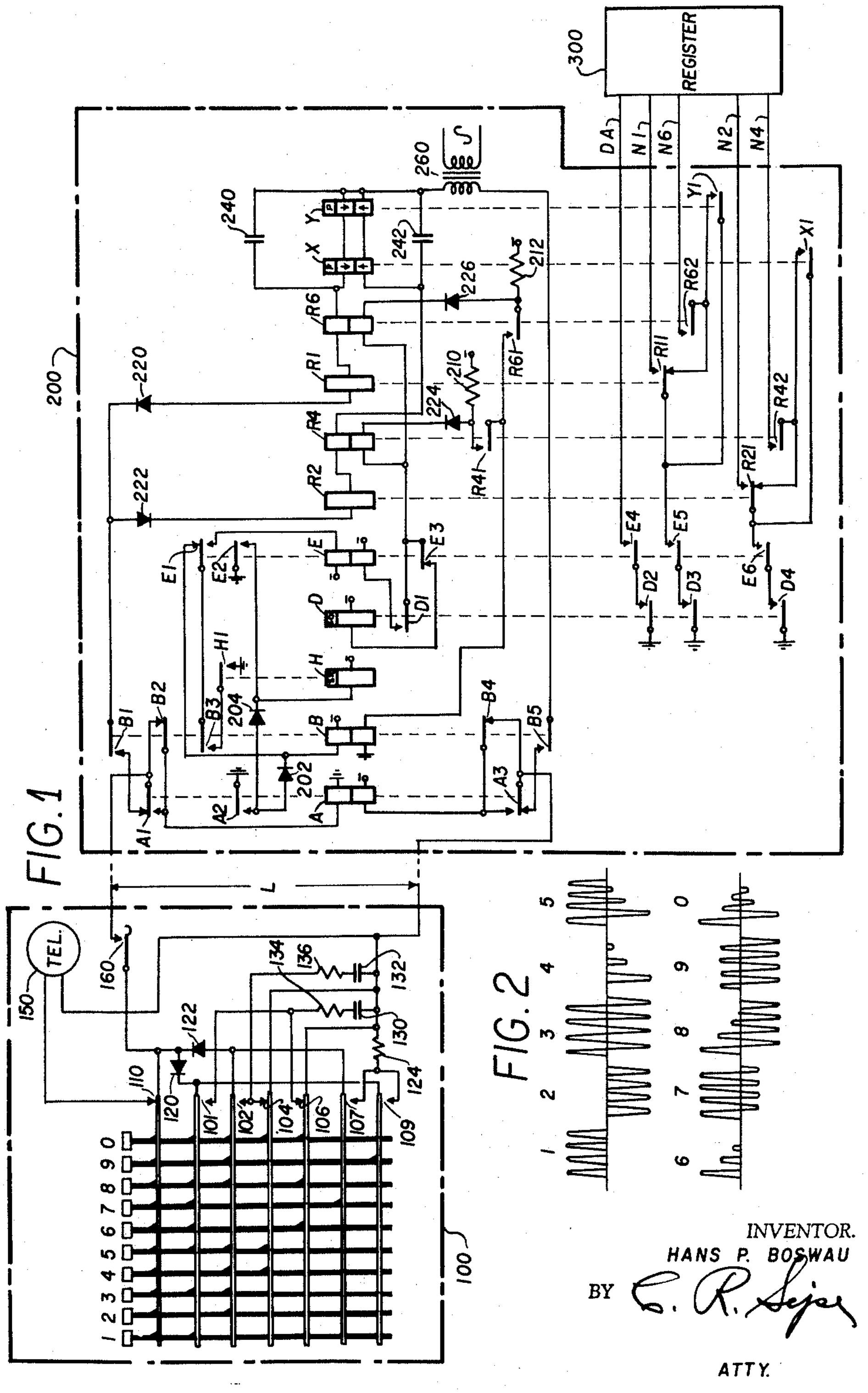

This invention relates to a signaling system, and more particularly to an arrangement for transmitting the numerical designation of a line being called in an automatic telephone switching system.

The general object of this invention is to provide an arrangement for transmitting a plurality of items of information with a single impulse per item, between remote locations connected only by a two-conductor line, without using a ground connection at the transmitting location and without the necessity of detecting discrete levels of voltage or current at the receiving location.

A specific object is to provide an improved push-button dialing arrangement for an automatic telephone switching system, using a key type impulse sender at each subscriber station.

Another object is to provide a simple and inexpensive key type of impulse sender for use at subscriber telephone stations.

Another object is to provide a detector used in conjunction with the register at the telephone central office for receiving the digits.

Circuit arrangements are known in which digital signals are produced with push buttons on the subscriber's set which connect resistors across the line, the value of resistance being characteristic of the digit to be transmitted. The signal receiver comprises means for testing the value of resistance connected. However, since such a test involves determining discrete levels of current or voltage, variations of the line loop resistance and leakage resistance adversely affect the accuracy of such a test. Arrangements are also known in which the push buttons at the subscriber set selectively connect diodes in the circuit so that the direction or directions in which current will flow is indicative of the digit to be transmitted. However, to obtain ten different combinations on a two wire line without using current margins, it is necessary to use a ground connection. The use of a ground path is not always feasible, as, for example, in arid areas. Other arrangements for push button or preset dialing are known, but these involve the use of rather complicated impulse senders.

According to the invention, in a signaling system in which an impulse sender and a detector are interconnected by a two-conductor line, alternating current is independently controlled in each direction of flow, each character being identified by a single impulse having one or more of the conditions (*a*) the presence or absence of current in either or both directions, (*b*) the difference, in one sense or the other, of the current level in the respective directions, when it flows in both directions, and (*c*) time modulation in either or both directions.

The impulse sender includes a plurality of passive elements including a pair of oppositely directed diodes and a switching arrangement for selectively connecting the elements to independently control the positive and the negative directions of current flow according to the character to be transmitted. The current in each direction may be substantially at a maximum value or zero, or the current in one direction may be substantially the maximum value which the current in the other direction is substantially less than the maximum value but substantially greater than zero.

The detector comprises an arrangement for independently detecting the current flow in each direction, and also includes an arrangement for detecting the condition in which current flows in both directions with that in one direction being substantially greater than that in the other direction.

Further according to the invention the ten different combinations required are obtained by providing an arrangement at the impulse sender for sending and at the detector for distinguishing a condition in which the current in either or both directions is of a shortened interval. This may be provided at the impulse sender by a condenser in series with a diode to cause the current to decay from the maximum value to zero during the impulse interval.

In a preferred embodiment of the invention, the impulse-sender passive elements comprise the two oppositely directed diodes, a resistor, and two condensers each preferably in series with a resistor. Selection of a combination of the passive elements is made by a switch arrangement comprising four make contacts, three break contacts, and ten push buttons for selectively actuating the contacts. The ten digital combinations are (1) the first diode connected directly, (2) the second diode connected directly, (3) both diodes connected in parallel, (4) the second diode connected in series with the condenser, (5) the first diode connected directly and the second diode connected in series with the condenser, (6) the first diode connected in series with the condenser, (7) the first diode connected directly and the second diode connected in series with the resistor, (8) the first diode connected in series with the condenser and the second diode connected directly, (9) the first diode connected in series with a resistor and the second diode connected directly, and (10) each diode connected in series with a condenser.

The preferred embodiment of the detector includes a set of detecting relays comprising two single-winding relays, two double-winding relays, and two biased polarized relays each having two equal opposing windings. During detection of an impulse these relays are connected across the line in two paths. Each path includes a diode, a single-winding relay, a winding of a double-winding relay, and one winding of each of the polarized relays all in series, the diodes in the respective paths being oppositely poled. The alternating-current source is transformer-coupled into one of the line wires at a point common to the two paths. The detector also includes a set of control relays. In response to each impulse the direct-current source is disconnected from the line, the detector relays and alternating-current source are connected, the identification of the digit is detected and transmitted to the register, and finally the detector relays and alternating-current source are disconnected and the direct-current source reconnected to the line. In each path through the detecting relays current flows in a direction corresponding to the path through one of the diodes of the impulse sender. Whenever current flows through one of the paths, the double-winding relay in that path operates, and locks in a circuit through the other winding. If the current through a path continues for the duration of the impulse, the single-winding relay operates. If the current in one path is substantially greater than that in the other path, one and only one of the polarized relays operates. If the current through a path is of shortened duration, e.g., because of the decay introduced by the condenser, only the double-winding relay remains operated at the time of registration, although the other relays having windings in the path may operate momentarily before registration.

The invention further relates to a method of signaling over a two-conductor line, in which the current in each direction is characterized as described above.

The above-mentioned and other features and objects of the invention and the manner of attaining them will become more apparent, and the invention itself will be best understood, by reference to the following description of an embodiment of the invention taken in conjunction with the accompanying drawings wherein:

FIG. 1 is a schematic diagram of an impulse sender connected by a two-wire line to a detector, along with a block diagram of a digit register; and FIG. 2 is a graph showing the wave forms of the current transmitted during the impulses for the respective digits.

Referring to FIG. 1 of the drawing, a subscriber station 100 is connected to a line L extending to a central office. The central office includes switching equipment (not shown) for establishing connections between lines. To receive the designation of a line being called from a calling line and to aid in establishing a connection, the office also includes registers, of which only one call detector 200 and digit register 300 are shown. Additional equipment not shown is provided to control to seizure and release of the detector 200, and to use the information given to digit register 300 to control setting up the connection to the called line. Station 100 includes a calling device comprising ten push buttons, seven contact sets, and a plurality of passive elements comprising diodes, condensers, and resistors. Station 100 also includes the usual telephone apparatus 150. The detector 200 includes five control relays A to E and six detector relays R2 to Y. The elements 120, 122, 220, and 222 may be any type of unidirectional elements, e.g., elements having a reverse current flow which is negligible compared to the forward current flow. They are shown as crystal diodes.

Assuming that the subscriber at station 100 desires to call another party, he lifts his handset (not shown), closing hookswitch contacts 160. This closes a direct-current path through contacts 160 and 110, through the telephone apparatus 150, over line L to a line relay (not shown) at the central office. This causes a connection to be set up from line L to detector 200, through switching apparatus (not shown) which may include one or more line finders, relay contacts, and the like. Direct-current battery and ground are supplied through the windings of relay A, contacts B2 and B4 of relay B, over the established connection to line L. Any other direct-current bridges supplying the connecting path have been cut off. Relay A operates and at its make contacts A1 and A3 closes another path from its windings to the line. Relay B operates over a path from battery, through its upper winding, diode 202, and contacts A2 to ground. The original operating path for relay A is opened at contacts B2 and B4. Relay H operates over a path from battery through its winding, diode 204, and contacts A2 to ground. Relay B locks over a path from battery, through its upper winding, contacts E1, contacts B3, and contacts H1 to ground.

The calling subscriber at station 100 then operates some of the push buttons 1 to 0 one at a time in an order corresponding to the number of the party being called. Each time one of the push buttons is operated, break contacts 110 open first to open the direct-current line loop. Relay A releases and at its contacts A1 and A3 opens the circuit to its windings. Since relay B remains operated from ground through contacts H1, a loop circuit is now closed from the upper conductor of line L through contacts A1 and B1, to diodes 220 and 222 and the detecting relays, and from the other side of the detecting relays through a winding of transformer 260, contacts B5 and A3 to the lower winding of line L. At transformer 260 an alternating current potential is supplied to this loop. One or more of the contacts 101 to 109 of the keyset are then closed to close a path through one or both of diodes 120 and 122. Current flows in the loop from transformer 260 through the detector relays and one or both of diodes 220 and 222, over the upper conductor of line L through one or both of diodes 120 and 122, and contacts of the keyset, and thence over the lower conductor of line L back to transformer 260. Because of the diodes the current through the detector relays will be unidirectional. At least one of the relays R4 and R6 will operate, and will lock through a path from ground through the lower winding of relay B, contacts R41 or R61 and diode 224 or 226, its own lower winding, contacts E3, through the winding of relay D, to battery. Battery is also supplied through resistor 210 or 212 and contacts R41 or R46, through the lower winding of relay B to ground. This circuit thus closes a separate holding path for relay B, a holding path for the operated one of relays R4 and R6, and an operating path for relay D. Since relay H is slow releasing, its contacts H1 will remain closed to supply ground to the upper winding of relay B after relay A releases, for the duration of the impulse. Relay D operates. Upon the closure of contacts D1, relay E operates over the circuit from battery through its lower winding. At contacts E3 the circuit to the winding of relay D is opened, which therefore releases. At contacts E2 ground is supplied to the winding of relay H. A locking circuit for relay E is closed from battery through its upper winding, contacts E1, B3, and H1 to ground. With relay D released and relay E operated, the circuit to the lower windings of relays R4 and R6 is opened. Through contacts D2 to D4 and E4 to E6 and contacts of the detector relays, a pulse of ground is supplied to digit-advance lead DA and one or more of the leads N1, N2, N4, and N6 to the digit register 300. When the circuit is opened at the contacts of the keyset at station 100, all of the detector relays and also relay B will release. Upon the closure of contacts 110 of the keyset, the direct current loop is again closed. Relay A operates to contacts B2 and B4 and locks at its contacts A1 and A3. Relays D and H operate from ground to contacts A2. The detector is then ready to receive the next digit.

There are ten distinctive combinations of current flow on line L corresponding respectively to the ten push buttons 1 to 0. At the secondary winding of transformer 260, taking the lower end as reference, the upper end will swing through positive and negative half cycles in potential. During the positive half cycles current flows through the upper windings of relays Y, X, and R6, relay R1, diode 220, line L, and diode 120, if contacts 101 or 109 of the keyset are closed. This will be referred to as the positive direction of current flow. During the negative half cycles current will flow through diode 122, over line L, diode 222 relay R2, the upper winding of relay R4, and the lower windings of relays X and Y, if contacts 102 or 107 of the keyset are closed. This will be referred to as the negative direction of current flow. In each direction there are four possible conditions of current flow. Taking the positive half cycles of potential as an example, the circuit through diode 120 may be opened in which case the current is substantially zero, there being a small reverse current through diode 122 if its path is closed. Diode 120 may be connected directly across the line, contacts 101 and 106 being closed, in which case the current will have a maximum value. Diode 120 may be connected in series with resistor 124, contacts 109 being closed, in which case the current will have a low value for the duration of the impulse. Diode 120 may be connected in series with condenser 130, contacts 101 being closed and contacts 106 being opened, in which case the current will have an initial maximum value and decay to zero as the condenser charges. Likewise, during the negative half cycles there will be four corresponding conditions with diode 122. Discharge resistors 134 and 136 are provided to limit the discharge current of condensers 130 and 132 respectively, condenser 130 in series with resistor 134 being normally shunted by contacts 106, and condenser 132 in series with resistor 136 being normally shunted by contacts 104.

The detector relays operate in various combinations according to the type of current flow. Relays R4 and R6 operate and lock on any of the three conditions of current flow other than zero in the corresponding direction. They remain locked until relay E operates and relay D releases. Relays R2 and R1 operate on either high or low current flow lasting for the duration of the impulse in the corresponding direction.

Relays X and Y are biased polarized relays, each having two equal opposing windings. The polarization may be provided by permanent magnets, by separate polarizing windings, or a combination of these, as is well known. The windings of relay X are connected so that current in its upper winding tends to operate the armature while current in the lower winding tends to restore it. The windings of relay Y are connected in the opposite sense, current in its upper winding tends to restore the armature while current in the lower winding tends to operate it. Therefore, whenever the current in the positive direction is substantially greater than in the negative direction relay X will operate, and when the current in the negative direction is sufficiently greater than in the positive direction, relay Y will operate. The windings of relays X and Y are shunted by condensers 240 and 242 in the respective paths.

Referring now to the graphs of FIG. 2 along with the diagram of FIG. 1, the transmission and detection of the digits will be explained individually as the push buttons are operated.

*Digit 1.*—Contacts 101 close and maximum current flows in the positive direction through the paths of diodes 220 and 120, as shown by the graph 1 in FIG. 2. Relays R1, R6, and X operate. During digit registration a ground pulse appears on lead N1 through contacts D3, E5, and R11.

*Digit 2.*—Contacts 102 are closed and maximum current flows in the negative direction through the paths of diodes 222 and 122, as shown by graph 2 in FIG. 2. Relays R2, R4, and Y operate. During digit registration a ground pulse appears on lead N2 through contacts D4, E6, and R21.

*Digit 3.*—Contacts 101 and 102 are closed and current of maximum value flows in both directions as shown by the graph 3 in FIG. 2. Relays R2, R4, R1, and R6 operate. During digit registrations a ground pulse appears on lead N1 through contacts D3, E5, and R11 and on lead N2 through contacts D4, E6, and R21.

*Digit 4.*—Contacts 102 are closed and 104 are opened, and decaying current flows in the negative direction through the paths of diodes 222 and 122 as shown by graph 4 in FIG. 2. Relay R4 operates. Relays R2 and Y may operate momentarily during condenser charge but will release before digit registration is made. During digit registration a ground pulse appears on lead N4 from ground through contacts D4, E6, R21, and R42.

*Digit 5.*—Contacts 101 and 102 are closed and 104 opened, and current of maximum value flows in the positive direction and decaying current flows in the negative direction as shown by graph 5 in FIG. 2. Relays R4, R1, R6, and X operate. Relays R2 and Y may operate momentarily during condenser charge but will release before digit registration is made. During digit registration a ground pulse appears on lead N1 through contacts D3, E5, and R11 and on lead N4 through contacts D4, E6, R21, and R42.

*Digit 6.*—Contacts 101 are closed and 106 are opened, and decaying current flows in the positive direction as shown by graph 6 in FIG. 2. Relay R6 operates. Relays R1 and X may operate momentarily during condenser charge but will release before digit registration is made. During digit registration a ground pulse will appear on lead N6 through contacts D3, E5, R11, and R62.

*Digit 7.*—Contacts 101 and 107 are closed, and current of maximum value flows in the positive direction and current of low value flows in the negative direction as shown by graph 7 in FIG. 2. Relays R2, R4, R1, R6, and X operate. During digit registration ground appears on lead N1 through contacts D3, E5, and R11, on lead N2 through contacts D4, E6, and R21 and on lead N4 through contacts D4, E6, X1, and R42.

*Digit 8.*—Contacts 101 and 102 are closed and 106 are opened. Decaying current flows in the positive direction and maximum current in the negative direction as shown by graph 8 in FIG. 2. Relays R2, R4, R6, and Y operate. Relays 1 and X may operate momentarily during condenser charge but will release before digit registration is made. During digit registration ground will appear on lead N6 through contacts D3, E5, R11, and R62, and on lead N2 through contacts D4, E6, and R21.

*Digit 9.*—Contacts 101 and 102 are closed and 106 opened. Current of low value flows in the positive direction and of maximum value in the negative direction as shown by graph 9 in FIG. 2. Relays R2, R4, R1, R6, and Y operate. During digit registration a ground pulse appears on lead N1 through contacts D3, E5, and R11; on lead N6 through contacts D3, E5, Y1, and R62; and on lead N2 through contacts D4, E6, and R21.

*Digit 0.*—Contacts 101 and 102 are closed and contacts 104 and 106 are opened. Decaying current flows in both the positive and negative directions as shown by graph 0 in FIG. 2. Relays R4 and R6 operate. Relays R2, R1, X, and Y may operate momentarily during condenser charge but will release before digit registration is made. During digit registration a ground pulse will appear on lead N6 through contacts D3, E5, R11, and R62, and on lead N4 through contacts D4, E6, R21, and R42.

This signaling arrangement provides ten selections over the two-conductor line loop without using ground. Unlike other such arrangements, it does not depend upon voltage steps or current margins, permitting operation over lines of varying loop and leakage resistance. However, it does involve timing margins.

In operating a button for a selection there must be an interval between opening the loop circuit at contacts 110 and closing the selection circuits at contacts 101 to 109, sufficient to release relay A at the detector. Also, in releasing the button a similar interval is necessary between opening the selection circuit and re-closure of the loop circuit to insure release of relays R4, R6, and B at the detector. These intervals can be obtained by giving the push buttons sufficient stroke, about ⅜ inch or more.

The second timing margin involves the charging of the condensers 130 and 132 at the station 100. These condensers must be charged enough to release relays R1 and R2 before relay E operates. At the same time the charging current must be sufficient to operate and lock relays R4 and R6. By selecting condensers of suitable size, this requirement can be met without difficulty for the minimum and maximum loop resistance. On zero loop the charging current is higher and the charging time shorter than on the maximum loop, but in either case the quantity of electricity required to charge the condenser is the same. Therefore, the amount of energy available for operating relays R4 and R6 is the same in both cases. Whether or not relays R1, R2, X, and Y operate on the condenser charge is of no importance, as long as relays R1 and R2 are normal when relay E operates.

Relays X and Y are needed to differentiate between codes 3, 7, and 9, but have no functions on any of the other seven codes. On code 3 the two opposing windings of each of relays X and Y are both energized over the line loop and therefore receive the same current no matter what the loop resistance may be. Since the opposing windings have the same number of turns, no flux will be generated in the relay cores and both relays remain normal.

On code 7 the current in the upper windings of relays X and Y is stronger than that in the lower windings. For the proper operation of relay X, resistor 124 at station 100 is given a value which reduces the current in the lower winding of relay X to a point where the ampere-turns generated in the upper winding less those generated in the lower winding are sufficient to operate the armature on the maximum loop. This will automatically insure proper operation on zero loop. On code 7 relay Y will have stronger current in its upper winding than in its lower winding and therefore will not operate no matter what the loop resistance may be. On code 9 the current in the upper windings of relays X and Y is weaker than that in the lower windings so that relay X remains normal and relay Y operates.

The design criteria for the detector relays and keyset elements are as follows. Relays 1 and 2 must operate through resistor 124 on the longest loop. Relays R4 and R6 must operate and lock on the charge of condensers 130 and 136 respectively on the longest loop. In relays X and Y the operating winding must operate the relay on the longest and shortest loop with the opposing winding receiving current through resistor 124.

Condensers 130 and 132 in the keyset must insure operation of relays R4 and R6 on the longest loop, and must be charged enough to release relays R1 and R2 before relay E operates. Resistor 124 must be low enough in value to insure operation of relays R1, R2, R4, and R6 on the longest loop and high enough to let relays X and Y operate with the opposing windings energized through resistor 124.

The frequency of the alternating-current source supplying the primary of transformer 260 is determined chiefly by the desired speed of key operation. Assuming that it is almost impossible to depress a button for less than $\frac{1}{20}$ of a second, about 50 milliseconds are available for the pulse, requiring a frequency of 200 to 300 cycles per second. If the subscribers can be expected to depress the keys for a reasonable length of time, 120 cycles per second is satisfactory. This can be obtained by doubling 60-cycle power.

On party lines it may be necessary to use gas tubes in series with the ringers to prevent mutilation of the pulses, unless the impedance of the ringer is high enough to prevent this trouble. In this case the voltage of the alternating current should be low enough to prevent firing of these gas tubes.

In the digit register 300 it is a simple matter to convert the ground pulses on leads N1, N6, N2, and N4 to a signal on one lead out of ten such as by using four relays with an appropriate contact network, as is well known. Or the ground pulses may be translated into any other desired manner suitable for use in establishing the connection to the called line.

It will be readily apparent that an electronic detector may be provided in place of the relay detector 200.

The principles of this invention may be used for numerical signaling in telephone systems other than subscriber dialing. The impulse sender provides a good operator's key set. The principle may also be applied to automatic signal repeaters, such as are provided, for example, in inter-office register sender systems.

The principles of this invention may also be applied to many signaling purposes other than dialing. For example, for station identification each station may be provided with one or two passive elements connected across the line during an interval when the direct-current path at the station is open. The connection of the elements could be controlled by a dial, or by a special push button.

What is claimed is:

1. In a system for signaling over a two-conductor line, a source of alternating current, an impulse sender and means for connecting it to said line, a detector and means for connecting it to said line, said impulse sender including a unidirectional element, a condenser, and switching means, said detector including a double-wound relay and a locking path through one of the windings and contacts of the relay, means responsive to an operation of said switching means for connecting said unidirectional element, said condenser, said current source, said line, and the other winding of said relay in series loop, thereby causing said relay to operate during the charge of said condenser and to lock through said locking path.

2. In a signaling system according to claim 1, said impulse sender including a second unidirectional element oppositely directed with respect to the first said element, and a second condenser, said detector including a second double-wound relay having a locking path through one of its windings and its contacts, and a pair of oppositely directed unidirectional elements respectively in series with said relays in parallel paths, means responsive to operation of said switching means for causing a loop including the said current source, the said detector paths, the said line, and selectively either or both of said impulse-sender unidirectional elements in series with the corresponding condenser, to thereby operate and lock either or both relays in accordance with the impulse-sender switching connection.

3. In a signaling system according to claim 2, said impulse-sender switching means further including means for connecting either of said impulse-sender unidirectional elements directly across said line while connecting the other either directly, or in series with its condenser, or not connecting it, said detector further including third and fourth relays connected respectively in series with said first and second relays, each of said third and fourth relays operating responsive to and remaining in the operated condition substantially only during the direct connection of the corresponding unidirectional element at the impulse sender.

4. An impulse sender in a signalling system for transmitting any of a plurality of characters over a line consisting of ony two conductors, said impulse sender comprising a first and a second diode which are oppositely directed, a first and a second capacitor, a limiting resistor, and switching means for selectively connecting the diodes, capacitors and resistor to the line in series with a source of alternating current potential in the combinations comprising (1) the first diode connected across the line to transmit unidirectional current having a given peak value in a first direction, (2) the second diode connected directly across the line to transmit unidirectional current having said given peak value in a second direction, (3) both diodes connected directly across the line in parallel opposition to transmit alternating current having said given peak value in both directions, (4) the second diode and second capacitor connected in series across the line to transmit unidirectional current in the second direction with a decaying peak value, (5) the combinations one and four simultaneously, (6) the first diode and first capacitor connected in series across the line to transmit unidirectional current in the first direction having a decaying peak value, (7) the first diode connected directly across the line and the second diode connected in series with the limiting resistor across the line to transmit current having said given peak value in the first direction and having a peak value in the second direction which is substantially less than said given value and substantially greater than zero, (8) the combinations two and six simultaneously, (9) the second diode connected directly across the line and the first diode connected in series with the limiting resistor across the line to transmit current having said given peak value in the second direction and a value substantially less than said given value and substantially greater than zero in the first direction, (10) combinations four and six simultaneously.

5. An impulse sender in a signaling system according to claim 4, wherein each said condenser is normally connected in series with a discharge resistor in a closed loop, and said switching means includes means for opening each said loop to effectively connect the condenser in series with a diode.

6. An impulse sender in a signaling system according to claim 4, wherein said switching means comprises a plurality of actuating members and a plurality of coding contact sets, and further including a first discharge resistor in series with said first condenser and a second discharge resistor in series with said second condenser, respective normally closed contacts of said switching means which normally shunt each capacitor and its discharge resistor, said selective means including arrangements for opening the contacts across said first capacitor and its discharge resistor in combinations six, eight and ten; and to open the contacts across the second capacitor and its discharge resistor in combinations four, five and ten.

7. An impulse sender in a signaling system according to claim 6, wherein said impulse sender is associated with apparatus which in its operative condition provides a direct-current path across said line, and said switching means includes an auxiliary normally closed set of contacts actuated by operation of any of said actuating members to open said direct-current path before actuation of said coding contact sets and to maintain the direct-current path open until the coding contact sets are restored to normal.

8. In combination with an impulse sender in a signaling system according to claim 7, a detector connected to said impulse sender by said line, said source of potential being an alternating-current source, said detector including means for connecting a direct-current source to said line, and means responsive to the opening of said auxiliary contacts for disconnecting said direct current source and connecting said alternating current source to said line.

9. In a telephone system, a station including telephone apparatus which provides a direct-current path, a calling device, and hookswitch contacts, a two-conductor line connecting the station to a central office, a detector at the central office, means responsive to the closure of a direct-current path through said telephone apparatus upon the closure of said hookswitch contacts for connecting said detector to said line, means in said detector connecting a direct-current source to said line, said calling device comprising a plurality of passive elements and switching means for sending digital signals, said switching means comprising a plurality of actuating members, a plurality of coding contacts and a set of normally-closed auxiliary contacts, one of said actuating members being operated to actuate the auxiliary contacts and a combination of said coding contacts for the transmission of each digit, the direct-current path through the telephone apparatus being opened by actuation of the auxiliary contacts, and a selected path through the passive elements being closed by actuation of the coding contacts, means in the detector responsive to the opening of the direct-current path for disconnecting the direct-current source and connecting an alternating-current source and a detection circuit to the line, means in said detection circuit for producing a circuit condition according to the flow of current from the alternating-current source as modulated by the calling device passive elements, means in the detector for transferring the digital information to a register according to said circuit condition, means in the detector responsive to both the completion of said transfer and the cessation of current flow through said calling device for disconnecting the alternating-current source and detection circuit and connecting the direct-current source to the line.

10. In a telephone system according to claim 9, said calling-device passive elements including a pair of oppositely directed diodes, capacitive means and resistive means, said detection circuit comprising a plurality of detection relays and a pair of oppositely-directed detection diodes with two parallel paths each including one of said detection diodes and a plurality of windings of said detection relays in series, said detector further including a plurality of controlling relays for controlling said connection and disconnection of said sources and said transferring of the digital information to the register.

11. A detector for use in a signaling system in which a sender and the detector are interconnected by a two-conductor line, and in which signal current flowing in a loop including the line and extending through the sender and the detector is selectively modulated at the sender in accordance with a predetermined code, the modulated current values being substantially equal or substantially different in the positive and negative directions of flow, said detector including means with unidirectional elements for causing the positive direction of loop current to flow through a first path and the negative direction of loop current to flow through a second path, a circuit arrangement comprising first and second devices, means connecting each device to sense the difference between the current values in the two paths, and means for making each device polarity sensitive, so that responsive to the current values in the two paths being substantially equal both devices have a normal output condition, responsive to the current value being substantially greater in the first path the first device has an off-normal output condition while the second device remains normal, and responsive to the current value being substantially greater in the second path the second device has an off-normal output condition while the first device remains normal.

12. A detector according to claim 11, wherein each of said devices is a polar biased relay having two differentially connected windings, with one winding of each relay serially connected in the first path and the other winding of each relay serially connected in the second path.

13. A detector for use in a signaling system in which a sender and the detector are interconnected by a two conductor line, with a source of alternating current potential coupled into a loop including the line and extending through the sender and the detector, and in which a selective modulating arrangement at the sender causes current from the source to flow in the loop during a coding interval having an initial and a terminal portion, the modulated current in the two directions of flow having the same or different conditions selected from (1) exceeding a threshold value during the entire coding interval, (2) exceeding the threshold value during the initial portion of the interval and being substantially zero during the terminal portion, and (3) being substantially zero during the entire interval, said detector including means with unidirectional elements for causing the positive direction of loop current to flow through a first path and the negative direction of loop current to flow through a second path, a first device with means connecting it to sense current flow in the first path and to respond thereto to operate to an off-normal condition, and means for locking it off-normal for the remaining duration of the coding interval, a second device with means connecting it to sense current flow in the first path, to respond thereto to operate to an off-normal condition and to return to normal upon termination of the current, a third device with means connecting it to sense current flow in the second path, to respond thereto to operate to an off-normal condition, and means for locking it off-normal for the remaining duration of the coding interval, and a fourth device with means connecting it to sense current flow in the second path, to respond thereto to operate to an off-normal condition and to return to normal upon termination of the current, and means for producing an output registration signal from the detector in accordance with the condition of said four devices during the terminal portion of a coding interval.

14. A detector according to claim 13, wherein each of said devices comprises a relay, said first path having a unidirectional element, a relay winding of said first device, and a relay winding of said second device connected in series; and said second path having a unidirectional element, a relay winding of said third device, and a relay winding of said fourth device connected in series; and said means for locking the first and third devices off-normal respectively includes an additional winding and contact means on the corresponding relay, and said means for producing an output registration includes contact means of said four devices.

15. A detector according to claim 13, wherein the modulated current may further be selected to have a condition in which current flowing in both directions during the entire coding interval has a high value in one direction and a substantially lower value in the other direction, said detector further including fifth and sixth devices with means connecting them to sense the difference between the current values in the two paths, and means for making each of the fifth and sixth devices polarity sensitive so that responsive to the current values in the two paths being substantially equal both of the fifth and sixth devices have a normal output condition, responsive to the current value being substantially greater in the first path the fifth device has an off-normal output condition while the sixth device remains normal, and responsive to the current value being substantially greater in the second path the sixth device has an off-normal output condition while the first device remains normal, whereby ten different coded characters may be detected with each character represented by the impulse current transmitted during a coding interval over a single two conductor line loop.

16. A detector according to claim 15, wherein each of said first and third devices comprises a two-winding relay, each of said second and fourth devices comprises a relay having at least one winding, and each of said fifth and sixth devices comprises a polar biased relay having two differentially connected windings, said first path having a unidirectional element and a winding of each of the first, second, fifth and sixth devices connected in series, said second path having a unidirectional element, and a winding of each of the third, fourth, fifth and sixth devices connected in series, said means for locking the first and third devices off normal respectively includes the other winding and contact means on the corresponding relay, the two windings of the fifth device being connected in the first and second path respectively to produce opposing magnetic fields, and the two windings of the sixth device being connected in the first and second paths respectively to produce opposing magnetic fields, and said means for producing an output registration includes contact means of said six devices.

References Cited in the file of this patent

UNITED STATES PATENTS

| | | |
|---|---|---|
| 2,306,087 | Soffel | Dec. 22, 1942 |
| 2,347,108 | Hubbard | Apr. 18, 1944 |
| 2,367,522 | Pfleger | Jan. 16, 1945 |
| 2,386,133 | Meacham | Oct. 2, 1945 |
| 2,386,609 | Hubbard | Oct. 9, 1945 |
| 2,406,001 | Deakin | Aug. 20, 1946 |
| 2,636,946 | Deakin | Apr. 28, 1953 |
| 2,672,523 | Dunlap et al. | Mar. 16, 1954 |
| 2,864,079 | Anderson | Dec. 9, 1958 |